US012072024B2

(12) United States Patent
Kim et al.

(10) Patent No.: US 12,072,024 B2
(45) Date of Patent: Aug. 27, 2024

(54) SYSTEM AND METHOD FOR CONTROLLING ENGINE TORQUE ACCORDING TO TRANSMISSION HYDRAULIC PRESSURE

(71) Applicant: Hyundai Kefico Corporation, Gyeonggi-do (KR)

(72) Inventors: Nam-Hoon Kim, Gyeonggi-do (KR); Sung-Hyun Park, Gyeonggi-do (KR); Se-Hoon Son, Gyeonggi-do (KR); John-Ha Lee, Gyeonggi-do (KR)

(73) Assignee: Hyundai Kefico Corporation, Gyeonggi-do (KR)

( * ) Notice: Subject to any disclaimer, the term of this patent is extended or adjusted under 35 U.S.C. 154(b) by 0 days.

(21) Appl. No.: 18/139,894

(22) Filed: Apr. 26, 2023

(65) Prior Publication Data

US 2023/0407967 A1    Dec. 21, 2023

(30) Foreign Application Priority Data

May 12, 2022    (KR) .................. 10-2022-0058406

(51) Int. Cl.
*F16H 63/50*    (2006.01)
*F16H 61/04*    (2006.01)

(52) U.S. Cl.
CPC ....... *F16H 63/502* (2013.01); *F16H 61/0403* (2013.01); *F16H 2306/30* (2013.01); *F16H 2306/42* (2013.01)

(58) Field of Classification Search
CPC ............. F16H 63/502; F16H 61/0403; F16H 2306/30; F16H 2306/42

USPC .......................................................... 477/107
See application file for complete search history.

(56) References Cited

U.S. PATENT DOCUMENTS

| 4,933,851 | A  | * | 6/1990  | Ito ...................... B60W 30/18 477/109 |
| 2006/0040790 | A1 | * | 2/2006  | Tohta ................... B60W 10/11 477/109 |
| 2011/0313628 | A1 | * | 12/2011 | Chinbe .................. F02D 29/02 701/54 |

(Continued)

FOREIGN PATENT DOCUMENTS

KR    10-1732739 B1    5/2017

*Primary Examiner* — Colby M Hansen
(74) *Attorney, Agent, or Firm* — Fox Rothschild LLP

(57) ABSTRACT

A method of controlling engine torque according to transmission hydraulic pressure is performed by an engine torque control system of a vehicle. The method includes connecting an engine torque converter to an engine and an automatic transmission of the vehicle, calculating a required turbine torque after confirming an engine torque control condition, deriving and storing a value of turbine torque factor learning through turbine torque factor learning according to shift type and shift time, converting the stored value of turbine torque factor learning into an engine torque control value, and requesting the engine torque control value to be applied to engine output, by an engine torque controller during shifting of the automatic transmission, so that a new turbine torque calculation is performed through a hydraulic pressure reference at the beginning of physical shifting, thereby preventing a shift shock and transmission damage caused by unreasonably excessive or insufficient engine torque.

16 Claims, 2 Drawing Sheets

(56) References Cited

U.S. PATENT DOCUMENTS

2015/0120154 A1\* 4/2015 Masunaga ............. F16H 61/684
                                                                                 701/54

\* cited by examiner

SYSTEM AND METHOD FOR CONTROLLING ENGINE TORQUE ACCORDING TO TRANSMISSION HYDRAULIC PRESSURE

CROSS REFERENCE TO RELATED APPLICATION

The present application claims under 35 U.S.C. § 119(a) the benefit of Korean Patent Application No. 10-2022-0058406, filed on May 12, 2022, the entire contents of which are incorporated by reference herein.

BACKGROUND

(a) Technical Field

The present disclosure relates to engine torque control during shifting, in particular, to an engine torque control system that performs engine torque control by applying hydraulic pressure at the beginning of physical shifting to a turbine torque calculation during shifting to prevent shift shock and transmission damage.

(b) Description of the Related Art

Generally, in an automatic transmission system of a vehicle, a power transmission sequence is formed in the following order: engine→torque converter (damper clutch) →transmission input shaft→transmission output shaft→differential gear→vehicle wheels, where "→" indicates the power transmission path.

In particular, the torque converter is a mechanical device positioned between a pump impeller and a turbine, and is used to amplify torque and transmit power between the engine and an automatic transmission by fluid coupling.

Therefore, in the power transmission sequence of the above system, the torque converter (damper clutch) may generate heat due to slip during a process of directly connecting a pump impeller and a turbine runner, which may lead to transmission damage if excessive torque is introduced. To prevent this, engine torque reduction request logic between one or more system controllers is applied to account for excessive torque input. The system controllers may include an engine control unit (ECU) and a transmission control unit (TCU).

For example, an engine torque request value during shifting that is calibrated by repeated testing by a calibration engineer, e.g., to be suitable for improving shift smoothness is applied to the engine torque reduction request logic described above.

However, the engine torque request value during shifting of the engine torque reduction request logic is determined under the judgment of a person, and in particular, the engine torque request value is determined through a trial and error process to obtain an appropriate value for improving shift smoothness.

In the conventional method, it may be difficult to find the appropriate value for preventing shift shock and transmission damage due to the shift shock caused by excessive or insufficient engine torque request value that is inappropriate.

In particular, in the calculation of the engine torque request value during shifting, shift smoothness typically would be evaluated based on the calibration engineer's experience, which makes it difficult to find the appropriate engine torque request value for a vehicle and transmission by repeated testing by the engineer, which is time-consuming and inefficient.

SUMMARY

The present disclosure provides a system and method for controlling engine torque according to transmission hydraulic pressure, which can prevent shift shock and transmission damage caused by unreasonably excessive or insufficient engine torque, by applying hydraulic pressure at the beginning of physical shifting to a turbine torque calculation during shifting, and in particular, by calculating the turbine torque through a hydraulic pressure reference at the beginning of physical shifting when a turbine speed deviates from a current gear synchronous speed.

According to the present disclosure, a method of engine torque control according to transmission hydraulic pressure during shifting of an automatic transmission by an engine torque controller includes: providing an engine torque converter connected to an engine and an automatic transmission of a vehicle, the engine torque converter configured to distribute engine torque to wheels of the vehicle; confirming whether turbine speed difference satisfies a condition for entering the engine torque control during shifting of the automatic transmission; calculating turbine torque required for preventing a shift shock using one or more of turbine angular acceleration, driving resistance torque, and coupling solenoid torque; performing turbine torque factor learning using, as a stored value of turbine torque factor learning, a value obtained by applying at least one of accelerator pedal displacement, engine torque, and transmission fluid temperature at the beginning of actual shifting to the condition for entering turbine torque factor learning under the condition that no flare occurs during the shifting, applying average turbine acceleration or average engine torque difference reduction to the condition for prohibiting turbine torque factor learning, and generating the result of turbine torque factor learning in accordance with the shift time that began from the actual shifting start point; converting the stored value of turbine torque factor learning into an engine torque control value by required turbine torque; and requesting the engine torque control value to the engine.

According to a preferred embodiment, the shift type is distinguished by the ON signal of a switch for each shift type in a shift state.

According to a preferred embodiment, the turbine speed difference is calculated by applying the formula [turbine speed−current gear turbine synchronous speed], and the condition for entering engine torque control is satisfied when the turbine speed difference is greater than or equal to the turbine speed difference reference value.

According to a preferred embodiment, the required turbine torque is calculated by applying the formula {[turbine angular acceleration conversion value (turbine angular acceleration*moment of inertia)−driving resistance torque conversion value (the driving resistance torque*driving resistance coefficient)−coupling solenoid torque conversion value (the coupling solenoid torque*coupling solenoid coefficient)]/turbine coefficient}.

According to a preferred embodiment, the turbine angular acceleration conversion value is calculated by applying the formula [(turbine torque*turbine coefficient)+the driving resistance torque conversion value+the coupling solenoid torque conversion value], the turbine angular acceleration is calculated by applying the formula [(turbine current synchronous speed−turbine target synchronous speed)/target shift time], and the driving resistance torque is calculated by applying the formula (rolling resistance+gradient resistance+wind resistance). The rolling resistance is calculated by applying the formula [COS gradient*vehicle weight*gravitational acceleration*rolling resistance coefficient], the gradient resistance is calculated by applying the formula [SIN gradient*vehicle weight*gravitational acceleration], and the wind resistance is calculated by applying the formula [vehicle speed*air density*front area*air resistance coefficient*0.5] respectively.

According to a preferred embodiment, the coupling solenoid torque is calculated by applying the formula [((coupling solenoid hydraulic pressure*piston area)−spring force) *plate quantity*2*plate area*0.01*friction factor*gravitational acceleration].

According to a preferred embodiment, the no flare occurrence condition is checked by the flare occurrence condition in an upshift and the flare occurrence condition in a downshift. [turbine speed>current gear turbine synchronous speed] or [turbine speed<target gear turbine synchronous speed] is applied to the flare occurrence condition in an upshift, and [turbine speed<current gear turbine synchronous speed] or [turbine speed>target gear turbine synchronous speed] may be applied to the flare occurrence condition in a downshift.

According to a preferred embodiment, the condition for entering turbine torque factor learning may be satisfied when the conditions [the actual shifting start point<start point reference value], [sensor displacement value 1<the accelerator pedal scope (APS)<sensor displacement value 2], [engine torque value 1<the engine torque<engine torque value 2], and [fluid temperature value 1<the transmission fluid temperature<fluid temperature value 2] are all satisfied.

According to a preferred embodiment, the condition for prohibiting turbine torque factor learning may be satisfied when the condition [the average turbine acceleration during a predetermined period when the target gear turbine synchronous speed and the turbine speed differ by a predetermined value or less>average turbine acceleration reference value] or [the engine torque difference reduction generation time of [engine torque difference (engine torque-engine torque intervention)<engine torque difference reference value]>engine torque difference reduction reference value] is satisfied.

According to a preferred embodiment, the engine torque control value may be calculated by applying the formula [stored value of turbine torque factor learning*(required turbine torque/torque converter torque amplification ratio)], and the torque converter torque amplification ratio is the turbine speed/engine speed ratio.

An engine torque control system of the present disclosure for achieving the object described above may include an engine torque converter connected to an engine and an automatic transmission of a vehicle, the engine torque converter configured to distribute engine torque to wheels of the vehicle, an engine torque controller that calculates the required turbine torque after confirming the engine torque control condition during shifting of the autonomous transmission, converts a stored value of turbine torque factor learning derived through turbine torque factor learning according to shift type and shift time that began from the actual shifting start point, and requests the engine torque control value, and a vehicle data provider that detects sensor signals of the engine and automatic transmission of the vehicle and transmits the signals to the engine torque controller.

According to a preferred embodiment, the engine torque controller may include a check unit confirming the engine torque control condition with data from the vehicle data provider, a calculation unit calculating the required turbine torque under the condition that the engine torque control condition is satisfied, a learning unit deriving and storing a value of turbine torque factor learning by a turbine torque factor learning map according to shift type and shift time, a conversion unit converting the stored value of turbine torque factor learning into the engine torque control value by required turbine torque, and a request unit requesting the engine torque control value to the engine.

A non-transitory computer readable medium containing program instructions executed by a processor of the present disclosure includes: program instructions that confirm whether a turbine speed difference satisfies a condition for entering engine torque control during shifting of an automatic transmission; program instructions that calculate a required turbine torque for preventing a shift shock using at least one of a turbine angular acceleration, a driving resistance torque, or a coupling solenoid torque; program instructions that perform turbine torque factor learning using, as a stored value of turbine torque factor learning, a result obtained by applying one at least one of an accelerator pedal scope (APS), an engine torque, and a transmission fluid temperature at the beginning of actual shifting to a condition for entering the turbine torque factor learning under the condition that no flare occurs during the shifting, applying average turbine acceleration or average engine torque difference reduction to a condition for prohibiting the turbine torque factor learning, and generating and storing the result of the turbine torque factor learning in accordance with the shift time that began from the actual shifting start point; program instructions that convert the stored value of turbine torque factor learning into an engine torque control value by the required turbine torque; and program instructions that apply the engine torque control value to an engine of a vehicle.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
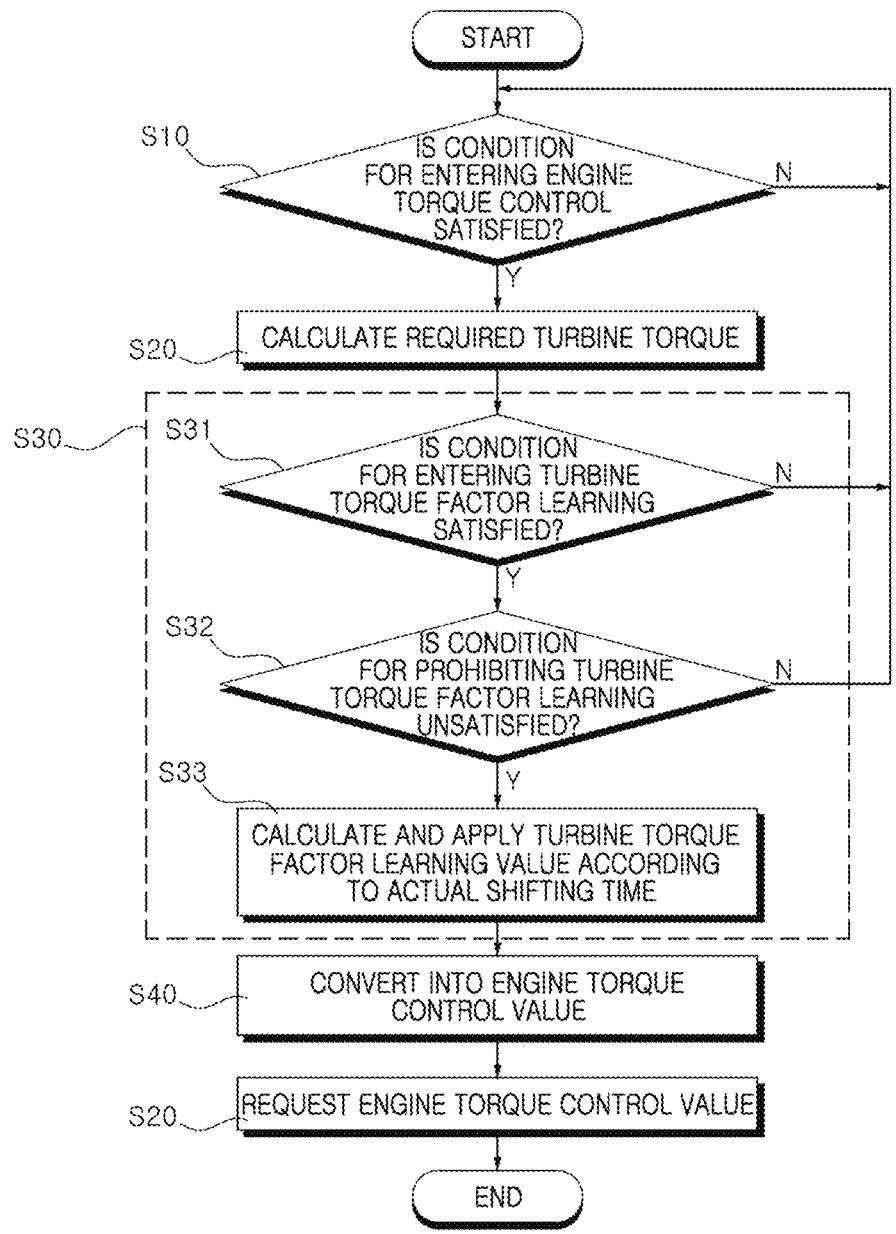
FIG. 1 is a flowchart of an engine torque control method according to transmission hydraulic pressure according to the present disclosure.

Hereinafter, embodiments of the present disclosure will be described in detail with reference to the accompanying drawings. Since the embodiments can be implemented in various forms by those skilled in the art to which the present disclosure pertains, the disclosure is not limited to the embodiments described herein FIG. 1 shows that a method of engine torque control according to transmission hydraulic pressure includes confirming whether a condition for entering engine torque control is satisfied (S10), calculating required turbine torque (S20), learning a turbine torque factor (S30), converting into an engine torque control value (S40), and requesting the engine torque control value (S50).

By the method of engine torque control according to transmission hydraulic pressure as described above, the turbine torque is calculated based on the hydraulic pressure at the point when the turbine speed deviates from a current gear synchronous speed at the beginning of physical shifting during shifting and then an engine torque value appropriate for the calculated turbine torque is requested so that the provision of inappropriate engine torque such as excessive or insufficient torque that may cause a shift shock may be prevented, and in particular, transmission damage caused by the shift shock may be prevented.

The method of engine torque control according to transmission hydraulic pressure will be described in detail with reference to FIG. 2 in the following.

In particular, the method is applicable to a vehicle in which an engine torque converter is connected to an engine and an automatic transmission of the vehicle, where the engine torque converter is configured to distribute engine torque to wheels of the vehicle.

Figure 2:
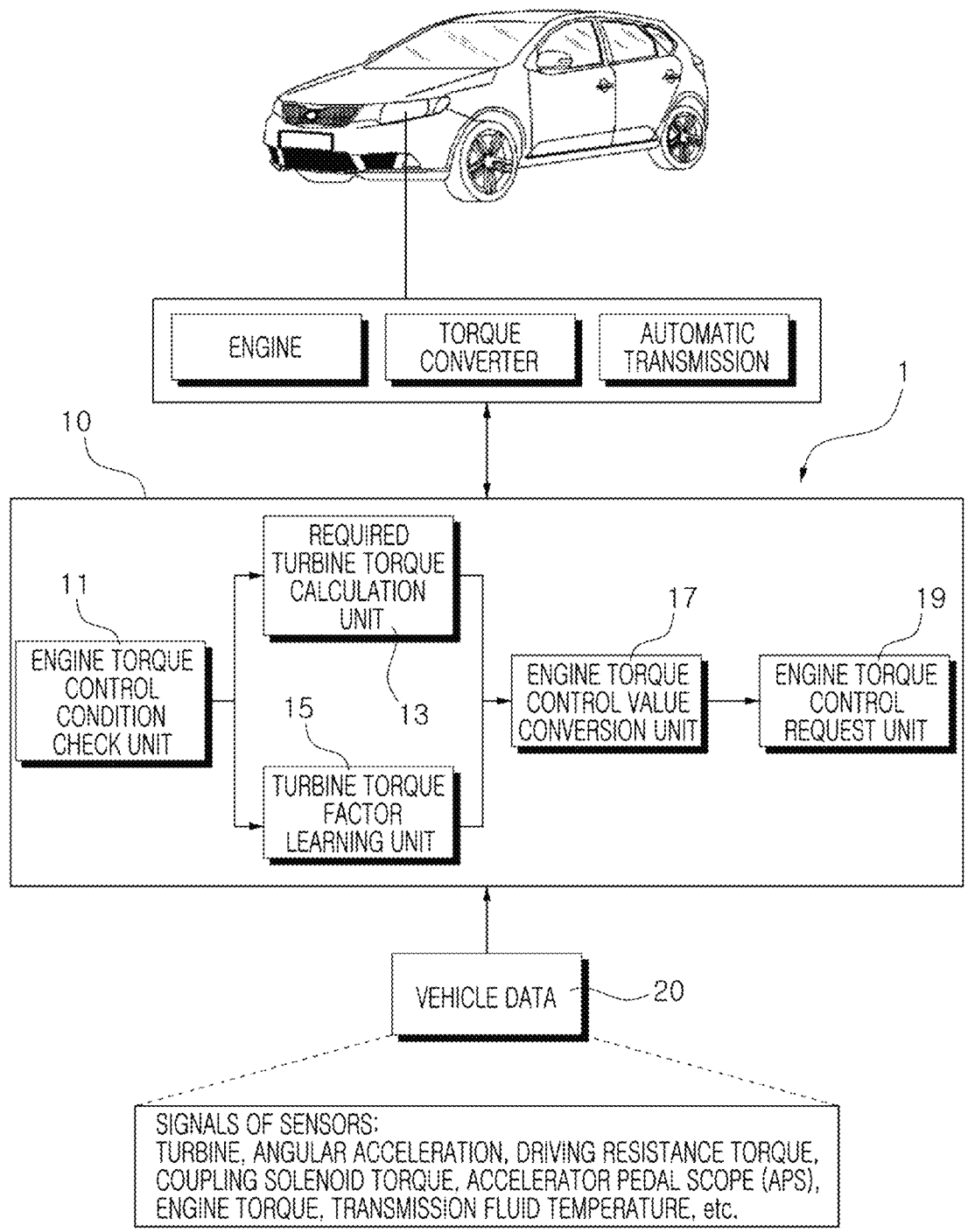
FIG. 2 is a configuration example of an engine torque control system that performs engine torque control by reducing engine torque of an engine in a vehicle according to the present disclosure.

FIG. 2 shows that an engine torque control system 1 includes an engine torque controller 10 and a vehicle data provider 20 for a vehicle equipped with an 8-speed automatic transmission on the front wheels and that the engine torque controller 10 includes a check unit 11, a calculation unit 13, a learning unit 15 equipped with a turbine torque factor learning map and a torque converter torque amplification ratio map, a conversion unit 17, and a request unit 19. In this case, the engine torque controller 10 has a memory with built-in engine torque control logic according to the transmission hydraulic pressure, operates as a central processing unit, and uses a control area network (CAN).

In particular, the vehicle data provider 20 described above transmits signals from vehicle-mounted sensors such as a vehicle speed sensor, an engine speed sensor, a turbine speed sensor, a hydraulic pressure sensor, a transmission switch sensor, a fluid temperature sensor, a torque sensor, a gravitational acceleration sensor, and the like to the engine torque controller 10 and provides information about a torque converter, a turbine, a solenoid, a piston, a spring, a plate, and the like, which are components of the automatic transmission, to the engine torque controller 10 so that the engine torque controller 10 may calculate the turbine angular acceleration, driving resistance torque (i.e. rolling resistance, gradient resistance, wind resistance), and coupling solenoid torque.

Further, the formulae applied in the following description are universally used under the same conditions for preventing a shift shock, and the control variables and values thereof applied to the formulae according to this feature are calculated differently depending on the specification and type of automatic transmission, so they are not limited to a specific value.

First, confirming whether a condition for entering engine torque control is satisfied (S10) is a step of confirming an engine torque control condition during a gearshift of a vehicle.

To this end, the check unit 11 of the engine torque controller 10 checks ON state of a switch for each shift type during shifting through the information provided by the vehicle data provider 20 and determines whether the condition for entering is satisfied based on a check formula of the condition for entering engine torque control.

Check formula of the condition for entering engine torque control: turbine speed difference (turbine speed−current gear turbine synchronous speed) >turbine speed difference reference value   (1)

The condition for entering engine torque control (S10) is checked by whether the turbine speed difference satisfies the condition for entering engine torque control.

Gearshift is divided into a plurality of gearshift phases including a gearshift preparation phase, an actual shifting phase, and a gearshift completion phase, and each phase has a shift time that corresponds to the time required from start to end, and a transition state from one phase to another is defined as the starting point in the following.

Next, the required turbine torque calculation (S20) is a step in which the required turbine torque that does not cause a shift shock during shifting is calculated. This step is performed when the turbine speed difference between the turbine speed and the current gear turbine synchronous speed is greater than or equal to a predetermined threshold.

To this end, the calculation unit 13 of the engine torque controller 10 applies a calculation formula of the required turbine torque using the information provided by the vehicle data provider 20.

Calculation formula of required turbine torque: required turbine torque=[(turbine angular acceleration*moment of inertia)−(driving resistance torque*driving resistance coefficient)−

(coupling solenoid torque*coupling solenoid coefficient)]/turbine coefficient (2)

Here, (1) (turbine angular acceleration*moment of inertia)=(turbine torque*turbine coefficient)+(driving resistance torque*driving resistance coefficient)+(coupling solenoid torque*coupling solenoid coefficient), (2) turbine angular acceleration=(turbine current synchronous speed−turbine target synchronous speed)/target shift time (fast and shock-free gearshift is targeted), and (3) driving resistance torque=rolling resistance (COS (gradient)*vehicle weight*gravitational acceleration*rolling resistance coefficient)+gradient resistance (SIN (gradient)*vehicle weight*gravitational acceleration)+wind resistance [(vehicle speed (m/s))^2*air density*front area*air resistance coefficient*0.5]. Here, the "target shift time" refers to the target time required to prevent a shift shock during the time required for gearshift from start to end.

In addition, (4) coupling solenoid torque=[((coupling solenoid hydraulic pressure*piston area)−spring force)*plate quantity*2*plate area*0.01*friction factor*gravitational acceleration]. And the moment of inertia is the moment of inertia value according to the transmission specification, and the coefficient refers to the coefficient map reflecting the design value.

As a result, the required turbine torque calculation (S20) reflects vehicle characteristics together with the automatic transmission characteristics so that the required turbine torque is calculated based on the hydraulic pressure at the beginning of the physical shifting during shifting.

Then, the turbine torque factor learning (S30) is performed by the learning unit 15 of the engine torque controller 10 deriving a learning value using a turbine torque factor learning map according to the shift type and the shift time and then storing the value in the map. Here, the "shift time" refers to the time required for the gearshift from start to end.

To this end, the turbine torque factor learning (S30) is performed by confirming whether the condition for entering turbine torque factor learning is satisfied (S31), confirming whether a condition for prohibiting the turbine torque factor learning is unsatisfied (S32), and calculating and applying the turbine torque factor learning value according to actual shifting time (S33). Here, the "actual shifting time" refers to the time required for the actual shifting during the time required for gearshift from start to end.

For example, the condition formula of entering the turbine torque factor learning is applied to the confirming of whether the condition for entering the turbine torque factor learning is satisfied (S31) under the condition of no flaring during shifting.

Condition formula of flare occurrence in an upshift:
[turbine speed>current gear turbine synchronous speed] or [turbine speed<target gear turbine synchronous speed] (3).

Condition formula of flare occurrence in a downshift: [turbine speed<current gear turbine synchronous speed] or [turbine speed>target gear turbine synchronous speed] (4).

Condition formula of entering the turbine torque factor learning: [actual shifting start point<start point reference value], [sensor displacement value 1<accelerator pedal scope (APS)<sensor displacement value 2], [engine torque value 1<engine torque value<engine torque value 2], and [fluid temperature value 1<transmission fluid temperature<fluid temperature value 2] (5).

Here, the actual shifting start point and start point reference value are defined as the transition point at which the shift transitions between phases, but a time interval before and after the start point is applied for the application of the reference value. The sensor displacement value 1, engine torque value 1, and fluid temperature value 1 respectively refer to lower limit values applied to the corresponding components, while the sensor displacement value 2, engine torque value 2, and fluid temperature value 2 respectively refer to the upper limit values applied to the corresponding components.

Confirming whether the condition for prohibiting turbine torque factor learning is not satisfied (S32) is carried out to avoid a situation where the condition for prohibiting the learning is satisfied, such as "average turbine acceleration instability at a predetermined time" or "delay in the termination time of engine torque control" after the condition for entering turbine torque factor learning is satisfied (S31). To this end, the turbine torque factor learning prohibition condition formula is applied.

Condition formula of prohibiting the turbine torque factor learning: [average turbine acceleration during a predetermined time when the target gear turbine synchronous speed and turbine speed differ by a predetermined value or less>average turbine acceleration reference value] or [the engine torque difference reduction generation time of [engine torque difference (engine torque−engine torque intervention) <engine torque difference reference value] >engine torque difference reduction reference value)] (6)

As a result, a result of turbine torque factor learning is obtained using the turbine torque factor learning map according to the shift type and the shift time that began from the actual shifting start point after calculating the shift time from the shift type, and the resulting value is applied to the calculation and application of the turbine torque factor learning value (S33) as a stored value of turbine torque factor learning (that is, shift type and shift time).

Next, converting into the engine torque control value (S40) determines the engine torque control value required to prevent a shift shock by reflecting the calculated turbine torque factor learning value.

To this end, the conversion unit 17 of the engine torque controller 10 applies a conversion formula of a required engine torque control value.

Conversion formula of the engine torque control value: engine torque control value=[stored value of turbine torque factor learning (shift type/shift time)*(required turbine torque/torque converter torque amplification ratio (turbine speed/engine speed ratio))] (7).

Here, the torque converter torque amplification ratio is calculated through the torque converter torque amplification ratio map.

Finally, requesting the engine torque control value (S50) is made by requesting to the engine side the calculated conversion result of the engine torque control value through the request unit 19 of the engine torque controller 10. In this case, the engine torque controller 10 and the engine communicate with each other in a controller area network (CAN) manner.

Accordingly, the engine torque controller 10 calculates the turbine torque factor learning value according to the shift time that began from the actual shifting start point while proceeding with the learning only during normal gearshifts without flaring during the gearshift of the 8-speed automatic transmission on the front wheels, and in particular, allows the reflection of the turbine torque factor learning value calculated as an appropriate factor learning value through continuous monitoring after the learning value of current gearshift is reflected during the next gearshift.

As described above, by the method of engine torque control according to the transmission hydraulic pressure performed by the engine torque control system 1 according to the present embodiment, the engine torque controller 10 calculates the required turbine torque (S20) after confirming the engine torque control condition (S10), derives and stores the value of turbine torque factor learning through turbine torque factor learning according to the shift type and shift time that started at the actual shifting start point (S30), converts the stored value of turbine torque factor learning into the engine torque control value (S40), and requests the engine torque control value (S50) so that a new turbine torque calculation is performed through the hydraulic pressure reference at the beginning of the physical shifting when the turbine speed deviates from the current gear synchronous speed, thereby allowing prevention of the shift shock and transmission damage caused by the unreasonably excessive or insufficient engine torque.

The engine torque control according to the transmission hydraulic pressure of the engine torque control system of the present disclosure implements the following actions and effects.

First, the hydraulic pressure at the beginning of the physical shifting is applied to the turbine torque calculation so that the optimal shift time and engine torque request value may be applied during shifting. Second, the shift shock is reduced through the required engine torque request based on the transmission hydraulic pressure at the beginning of shifting so that shift smoothness can be improved. Third, excessive or insufficient engine torque is prevented by appropriate engine torque request during shifting so that clutch plate damage can be prevented, thereby prolonging the lifespan of the vehicle. Fourth, the difficulty of calculating engine torque request value that arose when the calculation was performed through a trial and error process under the judgment of the calibration engineer can be resolved, and in particular, the disadvantages of the time-consuming and inefficient process of finding the corresponding value can all be resolved.

What is claimed is:

1. A method of controlling engine torque of an engine of a vehicle according to transmission hydraulic pressure, the method comprising:
    providing an engine torque converter connected to the engine and an automatic transmission of the vehicle, the engine torque converter configured to distribute engine torque to wheels of the vehicle;
    confirming, in an engine torque controller, whether a turbine speed difference satisfies a condition for entering engine torque control during shifting of the automatic transmission;
    calculating, by the engine torque controller, a required turbine torque for preventing a shift shock using at least one of a turbine angular acceleration, a driving resistance torque, or a coupling solenoid torque;
    performing, by the engine torque controller, turbine torque factor learning using, as a stored value of turbine torque factor learning, a result obtained by applying one at least one of an accelerator pedal scope (APS), an engine torque, and a transmission fluid temperature at the beginning of actual shifting to a condition for entering the turbine torque factor learning under the condition that no flare occurs during the shifting, applying average turbine acceleration or average engine torque difference reduction to a condition for prohibiting the turbine torque factor learning, and generating and storing the result of the turbine torque factor learning in accordance with the shift time that began from the actual shifting start point;
    converting, by the engine torque controller, the stored value of turbine torque factor learning into an engine torque control value by the required turbine torque; and
    applying, by the engine torque controller, the engine torque control value to output of the engine.

2. The method of claim 1, wherein shift type is distinguished by an ON signal of a switch for each shift type in a shift state.

3. The method of claim 1, wherein:
    turbine speed difference is calculated by applying a formula:

turbine speed−current gear turbine synchronous speed, and the condition for entering the engine torque control is satisfied when the turbine speed difference is greater than or equal to a turbine speed difference reference value.

4. The method of claim 1, wherein the required turbine torque is calculated by applying a formula:

turbine angular acceleration conversion value (the turbine angular acceleration*moment of inertia)−driving resistance torque conversion value (the driving resistance torque*driving resistance coefficient)−coupling solenoid torque conversion value (the coupling solenoid torque*coupling solenoid coefficient)/turbine coefficient.

5. The method of claim 4, wherein the turbine angular acceleration conversion value is calculated by applying a formula:

(turbine torque*turbine coefficient)+the driving resistance torque conversion value+the coupling solenoid torque conversion value.

6. The method of claim 4, wherein the turbine angular acceleration is calculated by applying a formula:

(turbine current synchronous speed−turbine target synchronous speed)/target shift time.

7. The method of claim 4, wherein the driving resistance torque is calculated by applying a formula:

(rolling resistance+gradient resistance+wind resistance), wherein the rolling resistance is calculated by applying a formula:

COS gradient*vehicle weight*gravitational acceleration*rolling resistance coefficient, the gradient resistance is calculated by applying a formula:

SIN gradient*vehicle weight*gravitational acceleration, and the wind resistance is calculated by applying a formula:

vehicle speed*air density*front area*air resistance coefficient*0.5, respectively.

8. The method of claim 4, wherein the coupling solenoid torque is calculated by applying a formula:

((coupling solenoid hydraulic pressure*piston area)−
spring force)*plate quantity*2*plate
area*0.01*friction factor*gravitational acceleration.

9. The method of claim 1, wherein a no flare occurrence condition is checked by a flare occurrence condition in an upshift and a flare occurrence condition in a downshift, wherein:
  turbine speed>current gear turbine synchronous speed, or turbine speed<target gear turbine synchronous speed, is applied to the flare occurrence condition in an upshift, and
  turbine speed<current gear turbine synchronous speed, or turbine speed>target gear turbine synchronous speed, is applied to the flare occurrence condition in a downshift.

10. The method of claim 1, wherein the condition for entering the turbine torque factor learning is satisfied when the conditions:
  the actual shifting start point<start point reference value,
  sensor displacement value 1<the accelerator pedal scope (APS)<sensor displacement value 2,
  engine torque value 1<the engine torque<engine torque value 2, and
  fluid temperature value 1<the transmission fluid temperature<fluid temperature value 2, are all satisfied.

11. The method of claim 1, wherein the condition for prohibiting the turbine torque factor learning is satisfied when a condition:
  the average turbine acceleration during a predetermined period when the target gear turbine synchronous speed and the turbine speed differ by a predetermined value or less>average turbine acceleration reference value, or
  the engine torque difference reduction generation time of (engine torque−engine torque intervention)<engine torque difference reference value>engine torque difference reduction reference value is satisfied.

12. The method of claim 1, wherein the engine torque control value is calculated by applying a formula:

stored value of turbine torque factor learning*(required turbine torque/torque converter torque amplification ratio).

13. The method of claim 12, wherein the torque converter torque amplification ratio is a turbine speed/engine speed ratio.

14. An engine torque control system of an engine of a vehicle, the engine torque control system comprising:
  an engine torque converter connected to the engine and an automatic transmission of the vehicle, the engine torque converter configured to distribute engine torque to wheels of the vehicle;
  an engine torque controller that calculates required turbine torque after confirming an engine torque control condition during shifting of the autonomous transmission, derives a stored value of turbine torque factor learning through turbine torque factor learning according to shift type and shift time that began from an actual shifting start point, converts the stored value of turbine torque factor learning into an engine torque control value, and applies the engine torque control value to output of the engine; and
  a vehicle data provider that detects sensor signals of the engine and the automatic transmission of the vehicle and transmits the signals to the engine torque controller.

15. The system of claim 14, wherein the engine torque controller comprises:
  a check unit confirming the engine torque control condition with data from the vehicle data provider;
  a calculation unit calculating the required turbine torque under the condition that the engine torque control condition is satisfied;
  a learning unit deriving and storing the value of turbine torque factor learning by a turbine torque factor learning map according to the shift type;
  a conversion unit converting the stored value of turbine torque factor learning into the engine torque control value by the required turbine torque; and
  a request unit requesting the engine torque control value for applying the engine torque control value to output of the engine.

16. A non-transitory computer readable medium containing program instructions executed by a processor, the computer readable medium comprising:
  program instructions that confirm whether a turbine speed difference satisfies a condition for entering engine torque control during shifting of an automatic transmission;
  program instructions that calculate a required turbine torque for preventing a shift shock using at least one of a turbine angular acceleration, a driving resistance torque, or a coupling solenoid torque;
  program instructions that perform turbine torque factor learning using, as a stored value of turbine torque factor learning, a result obtained by applying one at least one of an accelerator pedal scope (APS), an engine torque, and a transmission fluid temperature at the beginning of actual shifting to a condition for entering the turbine torque factor learning under the condition that no flare occurs during the shifting, applying average turbine acceleration or average engine torque difference reduction to a condition for prohibiting the turbine torque factor learning, and generating and storing the result of the turbine torque factor learning in accordance with the shift time that began from the actual shifting start point;
  program instructions that convert the stored value of turbine torque factor learning into an engine torque control value by the required turbine torque; and
  program instructions that apply the engine torque control value to output of an engine of a vehicle.

* * * * *